United States Patent
Onodera et al.

(10) Patent No.: US 9,127,584 B2
(45) Date of Patent: Sep. 8, 2015

(54) RECOVERY CONTROL SYSTEM

(75) Inventors: Takao Onodera, Fujisawa (JP); Takuro Iwashita, Fujisawa (JP); Masanobu Minezawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 134 days.

(21) Appl. No.: 13/699,524

(22) PCT Filed: May 16, 2011

(86) PCT No.: PCT/JP2011/061213
§ 371 (c)(1),
(2), (4) Date: Nov. 21, 2012

(87) PCT Pub. No.: WO2011/148810
PCT Pub. Date: Dec. 1, 2011

(65) Prior Publication Data
US 2013/0186073 A1    Jul. 25, 2013

(30) Foreign Application Priority Data
May 25, 2010 (JP) ................ 2010-119714

(51) Int. Cl.
*F01N 3/00* (2006.01)
*F01N 11/00* (2006.01)
*F01N 3/20* (2006.01)

(52) U.S. Cl.
CPC ............. *F01N 11/00* (2013.01); *F01N 3/208* (2013.01); *B01D 2251/2067* (2013.01); *F01N 2610/02* (2013.01); *F01N 2610/1453* (2013.01); *Y02T 10/24* (2013.01)

(58) Field of Classification Search
CPC ............ F01N 2610/02; F01N 2900/1616
USPC .......... 60/274, 276, 277, 286, 295, 297, 301, 60/303
See application file for complete search history.

(56) References Cited

U.S. PATENT DOCUMENTS

| | | | | |
|---|---|---|---|---|
| 7,685,810 B2 * | 3/2010 | Hirata et al. | ..................... | 60/277 |
| 7,818,961 B2 * | 10/2010 | Leonard | ........................... | 60/286 |
| 7,886,525 B2 * | 2/2011 | Nishibu et al. | .................. | 60/286 |
| 7,975,470 B2 * | 7/2011 | Hirata et al. | .................... | 60/277 |

(Continued)

FOREIGN PATENT DOCUMENTS

| | | |
|---|---|---|
| DE | 19512339 A1 | 10/1996 |
| JP | 2000-303826 | 10/2000 |

(Continued)

OTHER PUBLICATIONS

International Search Report of Corresponding PCT Application PCT/JP2011/061213 mailed Jul. 26, 2011.

(Continued)

*Primary Examiner* — Binh Q Tran
(74) *Attorney, Agent, or Firm* — Staas & Halsey LLP

(57) ABSTRACT

A recovery control system that allows a dosing valve to recover from a malfunction to a normal state, or a liquid feed line through which urea solution is fed to recover from clogging to a normal state. An abnormality detector detects an abnormality of the dosing valve and a recovery controller controls a supply module to feed urea solution in the dosing valve back to an urea tank when the abnormality detector detects the abnormality.

3 Claims, 7 Drawing Sheets
(1 of 7 Drawing Sheet(s) Filed in Color)

(56) References Cited

U.S. PATENT DOCUMENTS

| | | | | |
|---|---|---|---|---|
| 8,033,096 B2* | 10/2011 | Nishina et al. | ............... | 60/277 |
| 8,145,408 B2* | 3/2012 | Karlsson et al. | ............. | 701/104 |
| 8,161,735 B2* | 4/2012 | Kitazawa | ..................... | 60/295 |
| 8,387,366 B2* | 3/2013 | Ohno | ............................ | 60/277 |

FOREIGN PATENT DOCUMENTS

| | | |
|---|---|---|
| JP | 2006-342736 | 12/2006 |
| JP | 2007-782 | 1/2007 |
| JP | 2008-202469 | 9/2008 |
| JP | 2009-264191 | 11/2009 |

OTHER PUBLICATIONS

Patent Abstracts of Japan, Publication No. 2007-000782, Published Jan. 11, 2007.
Patent Abstracts of Japan, Publication No. 2006-342736, Published Dec. 21, 2006.
Patent Abstracts of Japan, Publication No. 2000-303826, Published Oct. 31, 2000.
Patent Abstracts of Japan, Publication No. 2009-264191, Published Nov. 12, 2009.
Patent Abstracts of Japan, Publication No. 2008-202469, Published Sep. 4, 2008.
Written Opinion of the International Searching Authority mailed Jul. 26, 2011 in corresponding International Application No. PCT/JP2011/061213.
Espacenet English Abstract of German Application No. DE19512339, published on Oct. 2, 1996.
English Abstract of Japanese Reference No. 2006-342736, of record.
English Abstract of Japanese Reference No. 2007-00782.
English Abstract of Japanese Reference No. 2009-264191.

* cited by examiner

RECOVERY CONTROL SYSTEM

CROSS-REFERENCE TO RELATED APPLICATIONS

This application claims the benefit of Japanese Patent Application No. 2010-119714, filed on May 25, 2010, the contents of which is incorporated herein by reference, which serves as priority for PCT Application No. PCT/JP2011/061213, filed May 16, 2011.

TECHNICAL FIELD

The present invention relates to a recovery control system that allows a dosing valve to recover from a malfunction to a normal state or a liquid feed line through which urea solution is fed to recover from clogging to a normal state.

BACKGROUND ART

A selective catalytic reduction (SCR) system incorporating an SCR device that has been developed is an exhaust gas purification system that purifies exhaust gas of a diesel engine of $NO_X$.

The SCR system is to purify exhaust gas of $NO_X$ by supplying urea solution stored in a urea tank to an upstream part of the exhaust gas and reducing the $NO_X$ on an SCR catalyst with ammonia derived from the urea solution by the heat of the exhaust gas (see Patent Literature 1, for example).

A process of deriving ammonia from urea solution will be described below with reference to FIG. 6.

As shown in FIG. 6, as the temperature of the urea solution rises beyond the boiling point, water starts evaporating, and the urea solution transforms into melt and then to gas. The resulting gas crystallizes into solid as the temperature further rises. The resulting solid then sublimates into ammonia. Part of the melt and gas are hydrolyzed with steam to form ammonia and carbonic acid gas.

The urea solution is injected through a dosing valve (a urea injection device or a dosing module) provided at the upstream side of the SCR device.

As shown in FIG. 7, a dosing valve 104 includes a cylinder 127 having an injection orifice 128 and filled with urea solution at high pressure, a tubular plunger 130 having a slit 133, and a valving element 129 to close the injection orifice 128 that is attached to the plunger 130. A coil 131 is energized to pull up the plunger 130 to separate the valving element 129 from the injection orifice 128, thereby injecting the urea solution. Furthermore, a spring 132 is provided in the dosing valve 104 to bias the valving element 129 to be normally closed via the plunger 130. Therefore, when energization of the coil 131 is stopped, the plunger 130 is pushed down by the spring to make the valving element 129 close the injection orifice 128, thereby stopping injection of the urea solution.

The urea solution is supplied from the urea tank to the dosing valve 104 by a supply module ("SM"), which includes an SM pump, a urea solution pressure sensor and the like. More specifically, the urea tank and the supply module are connected to each other by a liquid feed line, and the urea solution sucked up from the urea tank through the liquid feed line is supplied to the dosing valve 104 through a pressure-feed line that connects the supply module and the dosing valve 104 to each other. In this process, the pressure of the urea solution in the dosing valve 104 (the measurement value of the urea solution pressure sensor of the supply module) is feedback-controlled to be constant, and injection of the urea solution starts when the pressure becomes constant.

CITATION LIST

Patent Literature 1: Japanese Patent Laid-Open No. 2000-303826

The dosing valve 104 is provided in the exhaust pipe, through which exhaust gas at high temperature flows. Therefore, as the temperature of the dosing valve 104 rises, the temperature of the urea solution in the dosing valve 104 also rises. As a result, the urea solution in the dosing valve 104 crystallizes and attaches to the valving element 129 as shown in FIG. 8(*a*), or the urea solution crystallizes into a solid 134, and the solid 134 gets caught between the valving element 129 and a valve seat on the cylinder 127 to make it impossible to stop injection of the urea solution as shown in FIG. 8(*b*), thereby leading to malfunction of the dosing valve 104 and failure of proper control of injection of the urea solution.

Furthermore, if the liquid feed line that connects the urea tank and the supply module to each other is clogged with a foreign matter, the pressure of the urea solution in the dosing valve 104 does not become constant or in other words does not rise, and there arises a problem that injection of urea solution does not start.

However, there has been proposed no recovery control to recover from such failures to a normal state.

SUMMARY OF THE INVENTION

It is an object of the present invention to provide a recovery control system that allows a dosing valve to recover from a malfunction to a normal state or a liquid feed line through which urea solution is fed to recover from clogging to a normal state.

A recovery control system is described herein for allowing a dosing valve through which urea solution is injected into an exhaust pipe to recover from a malfunction to a normal state, including a dosing valve and a supply module that sucks up urea solution in a urea tank and supplies the urea solution to the dosing valve and feeds the urea solution in the dosing valve back to the urea tank. The dosing valve has a cylinder charged with the urea solution, and a plunger that opens and closes a normally closed valving element of the cylinder and a coil that operates the plunger. The recovery control system further includes: an abnormality detection device for monitoring the dosing valve and detecting an abnormality of the dosing valve; and a recovery controller for controlling the supply module to feed the urea solution in the dosing valve back to the urea tank when the abnormality detection device detects an abnormality of the dosing valve.

The recovery control system may also allow for a liquid feed line to recover from clogging to a normal state, including a dosing valve through which urea solution is injected into an exhaust pipe and a supply module that sucks up urea solution in a urea tank and supplies the urea solution to the dosing valve and feeds the urea solution in the dosing valve back to the urea tank. The urea tank and the supply module are connected to each other by the liquid feed line. The recovery control system further includes: a pressure abnormality detector for detecting an abnormality in a urea solution pressure based on a measurement value of a urea solution pressure sensor that measures a pressure of the urea solution supplied to the dosing valve; and a recovery controller for controlling the supply module to feed the urea solution in the liquid feed line back to the urea tank when the pressure abnormality detection means detects an abnormality in the urea solution pressure.

According to the present invention, a dosing valve can recover from a malfunction to a normal state, and a liquid feed line through which urea solution is fed can recover from clogging to a normal state.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

In the following, embodiments of the present invention will be described with reference to the accompanying drawings.

First, an SCR system installed on a vehicle will be described.

Figure 1:
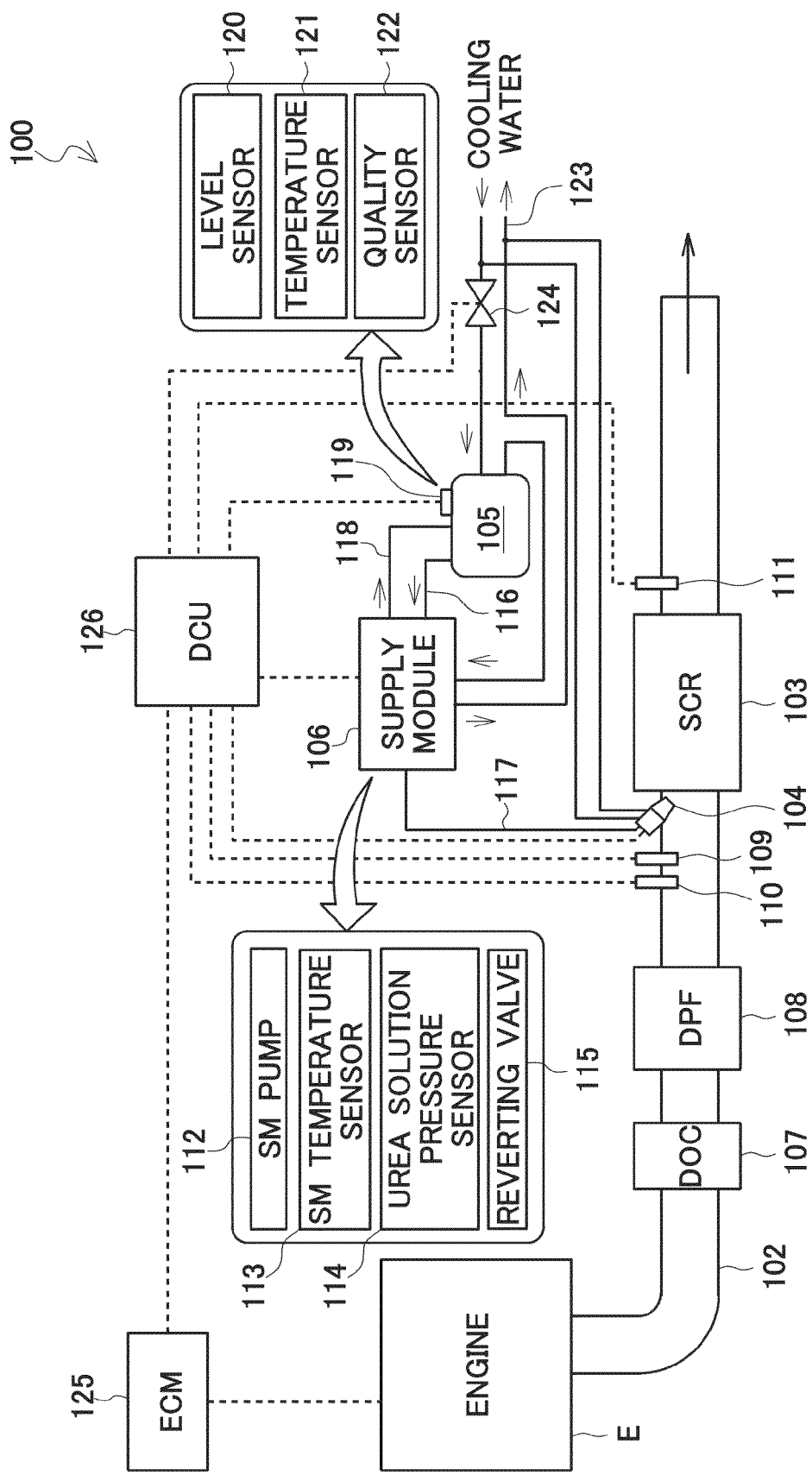
FIG. 1 is a schematic diagram showing an SCR system according to the present invention.

As shown in FIG. 1, an SCR system 100 primarily includes an SCR device 103 provided on an exhaust pipe 102 of an engine E, a dosing valve (a urea injection device or a dosing module) 104 that injects urea solution on the upstream side of the SCR device 103 (in an upstream part of exhaust gas), a urea tank 105 that stores the urea solution, a supply module 106 that supplies the urea solution stored in the urea tank 105 to the dosing valve 104, and a dosing control unit (DCU) 126 that controls the dosing valve 104, the supply module 106 and other components.

In order from upstream to downstream of the exhaust gas, the exhaust pipe 102 of the engine E is provided with a diesel oxidation catalyst (DOC) 107, a diesel particulate filter (DPF) 108 and the SCR device 103. The DOC 107 is intended to oxidize NO in the exhaust gas discharged from the engine E to produce $NO_2$ to adjust the ratio between NO to $NO_2$ in the exhaust gas in order to improve the denitration efficiency of the SCR device 103. The DPF 108 is intended to collect a particular matter (PM) in the exhaust gas.

Figure 7:
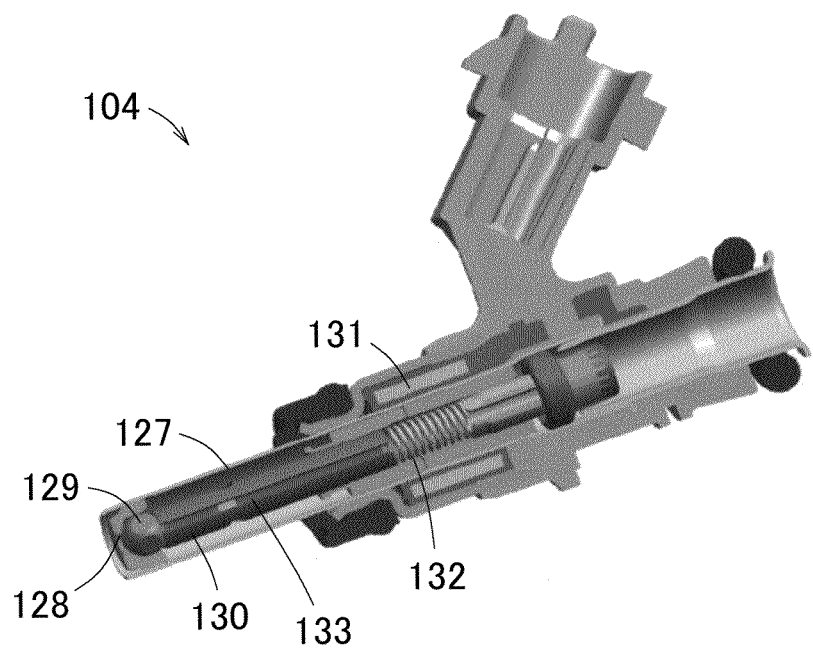
FIG. 7 is a cross-sectional perspective view of a dosing valve.
Figure 8:
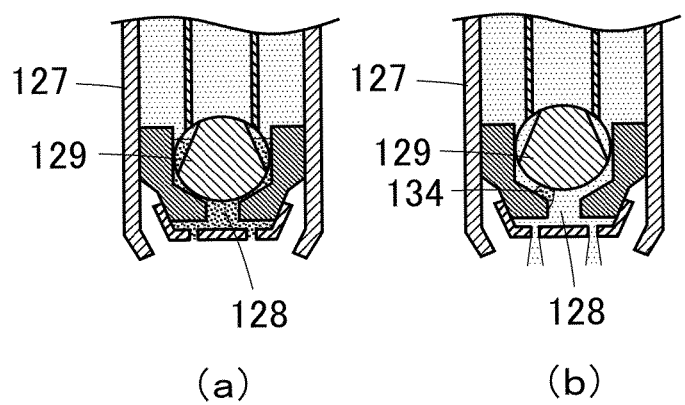
FIGS. 8(a) and 8(b) are cross-sectional views for illustrating failures of the dosing valve.

The exhaust pipe 102 is provided with the dosing valve 104 on the upstream side of the SCR device 103. As described above with reference to FIG. 7, the dosing valve 104 includes a cylinder 127 having an injection orifice 128 and filled with urea solution at high pressure, a tubular plunger 130 having a slit 133, and a valving element 129 to close the injection orifice 128 that is attached to the plunger 130, and a coil 131 is energized to pull up the plunger 130 to separate the valving element 129 from the injection orifice 128, thereby injecting the urea solution. Furthermore, a spring 132 is provided in the dosing valve 104 to bias the valving element 129 to be normally closed via the plunger 130. Therefore, when energization of the coil 131 is stopped, the plunger 130 is pushed down by the spring to make the valving element 129 close the injection orifice 128, thereby stopping injection of the urea solution.

On the upstream side of the dosing valve 104, the exhaust pipe 102 is provided with an exhaust gas temperature sensor 109 that measures the temperature (SCR inlet temperature) of the exhaust gas at an inlet of the SCR device 103. Furthermore, an upstream-side $NO_X$ sensor 110 that detects the $NO_X$ concentration on the upstream side of the SCR device 103 is provided on the upstream side of the SCR device 103 (on the upstream side of the exhaust gas temperature sensor 109 in this example), and a downstream-side $NO_X$ sensor 111 that detects the $NO_X$ concentration on the downstream side of the SCR device 103 is provided on the downstream side of the SCR device 103.

The supply module 106 includes an SM pump 112 that pressure-feeds the urea solution, an SM temperature sensor 113 that measures the temperature of the supply module 106 (the temperature of the urea solution flowing through the supply module 106), a urea solution pressure sensor 114 that measures the pressure of the urea solution in the supply module 106 (the pressure on the outlet side of the SM pump 112), and a reverting valve 115 that switches between urea solution flow channels to selectively supply the urea solution in the urea tank 105 to the dosing valve 104 or feed the urea solution in the dosing valve 104 back to the urea tank 105. In this example, the urea solution in the urea tank 105 is supplied to the dosing valve 104 when the reverting valve 115 is turned off, and the urea solution in the dosing valve 104 is fed back to the urea tank 105 when the reverting valve 115 is turned on.

When the reverting valve 115 is set to supply urea solution to the dosing valve 104, the SM pump 112 of the supply module 106 sucks up the urea solution in the urea tank 105 through a liquid feed line (suction line) 116, supplies the urea solution to the dosing valve 104 through a pressure-feed line (pressure line) 117, and feeds any excessive urea solution back to the urea tank 105 through a collection line (back line) 118.

In the key off state (ignition off state or vehicle stop state), the reverting valve 115 is switched to feed the urea solution in the dosing valve 104 back to the urea tank 105, thereby preventing crystallization of urea solution, which causes occurrence of malfunction of the dosing valve 104. The control to feed the urea solution in the dosing valve 104 back to the urea tank 105 is referred to as "emptying" in this specification.

In emptying, the dosing valve 104 is previously opened, and then the urea solution in the dosing valve 104 is fed back to the urea tank 105, so that the exhaust gas (air) in the exhaust pipe 102 is also sucked into the urea tank 105 via the dosing valve 104.

The urea tank 105 is provided with an SCR sensor 119. The SCR sensor 119 includes a level sensor 120 that measures the liquid level of the urea solution in the urea tank 105, a temperature sensor 121 that measures the temperature of the urea solution in the urea tank 105 and a quality sensor 122 that measures the quality of the urea solution in the urea tank 105. The quality sensor 122 determines the quality of the urea solution in the urea tank 105 by detecting the concentration of the urea solution or whether or not a foreign matter is mixed into the urea solution from the propagation velocity of an ultrasonic wave or the electrical conductivity.

A cooling line 123 through which cooling water for cooling the engine E circulates is connected to the urea tank 105 and the supply module 106. The cooling line 123 passes through the urea tank 105 so that heat exchange occurs between the cooling water flowing through the cooling line 123 and the urea solution in the urea tank 105. The cooling line 123 also passes through the supply module 106 so that heat exchange occurs between the cooling water flowing through the cooling line 123 and the urea solution in the supply module 106.

The cooling line 123 is provided with a tank heater valve (coolant valve) 124 that selectively supplies or does not supply the cooling water to the urea tank 105 and the supply module 106. The cooling line 123 is also connected to the dosing valve 104. However, the dosing valve 104 is configured to be supplied with the cooling water whether the tank heater valve 124 is open or closed. Although not shown in the simplified configuration shown in FIG. 1, the cooling line 123 is arranged along the liquid feed line 116, the pressure-feed line 117 and the collection line 118 through which the urea solution flows.

Figure 2:
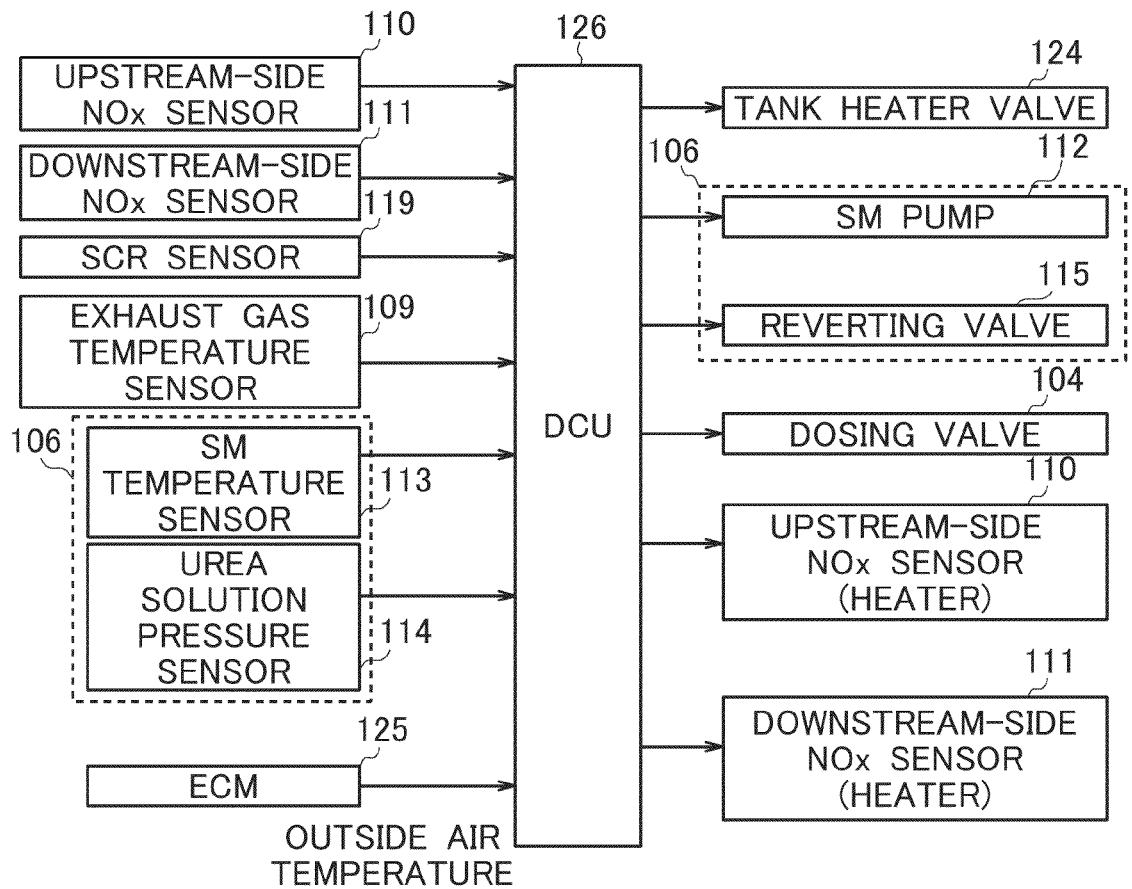
FIG. 2 is a diagram showing an input/output configuration of a DCU.

FIG. 2 is a diagram showing an input/output configuration of the DCU 126.

As shown in FIG. 2, input signal lines from the upstream-side $NO_X$ sensor 110, the downstream-side $NO_X$ sensor 111, the SCR sensor 119 (the level sensor 120, the temperature sensor 121 and the quality sensor 122), the exhaust gas temperature sensor 109, the SM temperature sensor 113 and the urea solution pressure sensor 114 of the supply module 106, and an engine control module (ECM) 125 that controls the engine E are connected to the DCU 126. Signals indicative of the outside air temperature and engine parameters (including the engine rotation speed) are input from the ECM 125.

Furthermore, output signal lines to the tank heater valve 124, the SM pump 112 and the reverting valve 115 of the supply module 106, the dosing valve 104, a heater of the upstream-side $NO_X$ sensor 110 and a heater of the downstream-side $NO_X$ sensor 111 are connected to the DCU 126. Signal exchange between the DCU 126 and each component can occur through the individual signal line or via a controller area network (CAN).

The DCU 126 is configured to estimate the amount of $NO_X$ in the exhaust gas based on a signal indicative of an engine parameter from the ECM 125 and the exhaust gas temperature from the exhaust gas temperature sensor 109 and determine the amount of urea solution to be injected through the dosing valve 104 based on the estimated amount of $NO_X$ in the exhaust gas. Furthermore, when the determined amount of urea solution is injected through the dosing valve 104, the DCU 126 is configured to control the dosing valve 104 based on the detection value from the upstream-side $NO_X$ sensor 110 to adjust the amount of urea solution injected through the dosing valve 104.

Figure 3:
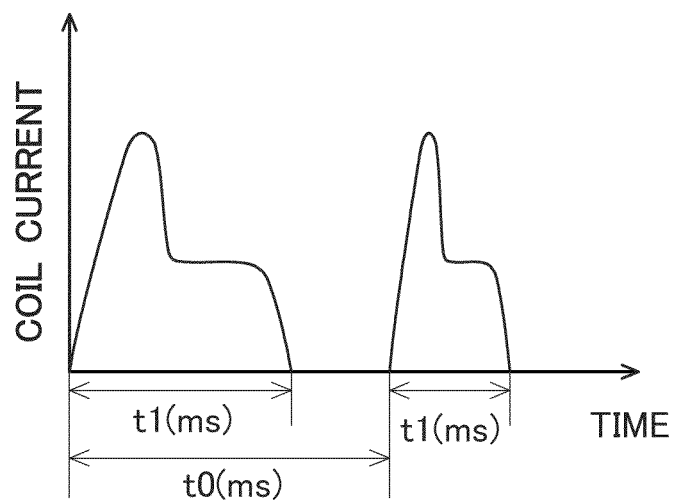
FIG. 3 is a graph showing a waveform of a coil current when a dosing valve is activated.

As shown in FIG. 3, the dosing valve 104 is energized to inject urea solution for a period of $t_1$ at (fixed) intervals of $t_0$. The length of $t_1$ varies with the amount of injected urea solution. In emptying, the energization is maintained for a predetermined time. The predetermined time is a length of time required to return the urea solution in the piping to the urea tank 105.

The SCR system 100 according to the present invention is provided with a recovery control system that allows urea solution in the dosing valve 104 that is heated by the exhaust gas at high temperature and crystallizes and attaches to the interior of the dosing valve 104 to recover from a malfunction to a normal state. The recovery control system is provided in the DCU 126 and includes a detector for detecting an abnormality of the dosing valve 104 and a recovery controller.

The abnormality detector is configured to detect an abnormality based on whether or not the open/close operation of the dosing valve 104 is normal.

The recovery controller is configured to control the supply module 106 to feed the urea solution in the dosing valve 104 back to the urea tank 105 when the abnormality detector detects an abnormality of the dosing valve 104. More specifically, the recovery controller is configured to open the dosing valve 104, switch the reverting valve 115 of the supply module 106, activate the SM pump 112 of the supply module 106 and forcedly perform emptying (forced emptying).

Figure 4:
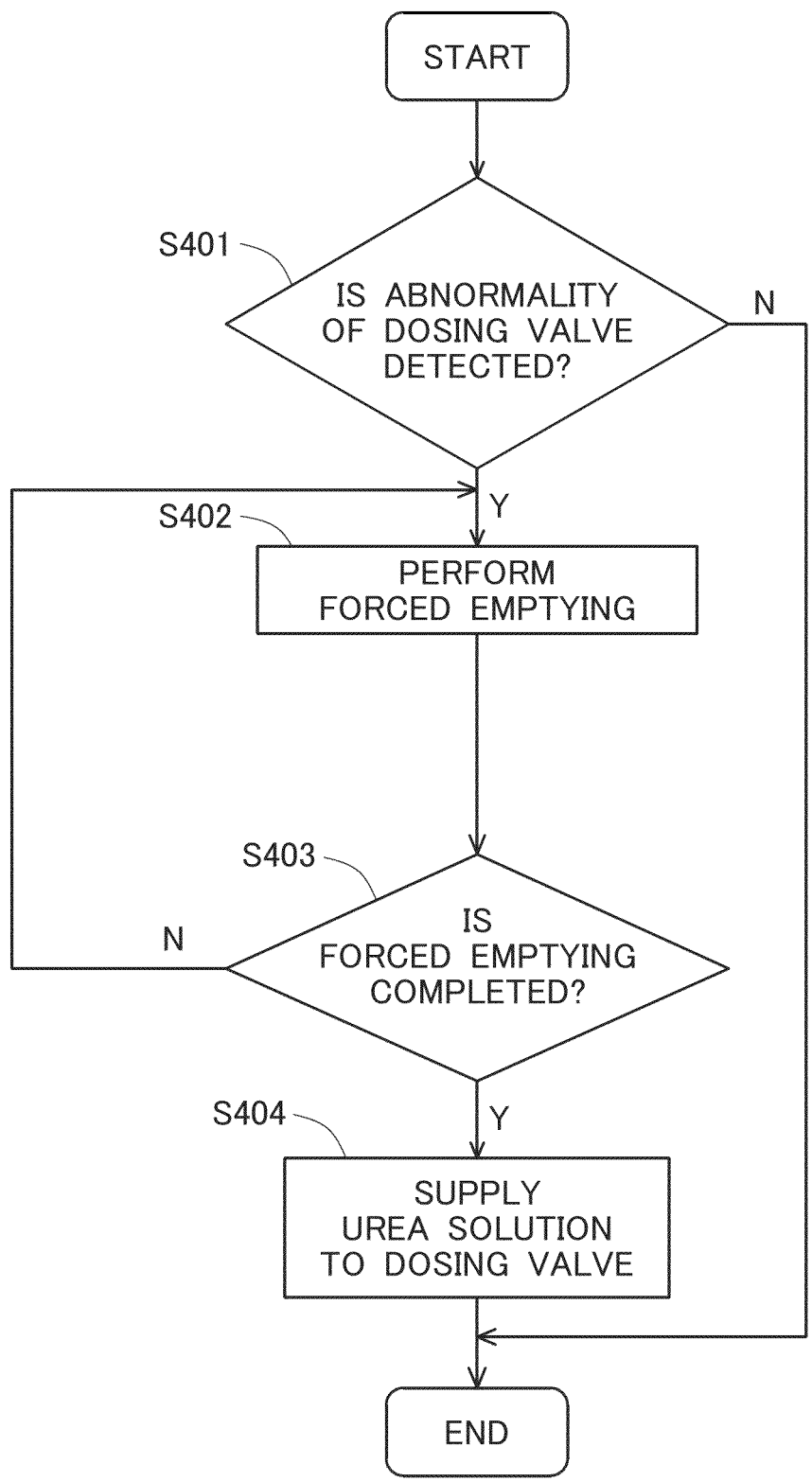
FIG. 4 is a flowchart illustrating an operation of a recovery control system according to the present invention.

An operation of the recovery control system will be described with reference to FIG. 4.

The recovery control system is configured to repeatedly perform the following operation.

The abnormality detector detects whether or not the dosing valve 104 is normal (S401).

If an abnormality of the dosing valve 104 is detected in S401, the recovery controller opens the dosing valve 104, switches the reverting valve 115 of the supply module 106, activates the SM pump 112 of the supply module 106 and performs forced emptying (S402).

Then, it is determined whether the forced emptying is completed (S403). If the forced emptying is completed, urea solution is supplied to the dosing valve 104 (S404).

In the course of repetition of the above operation, urea crystals can be removed along with the urea solution by the force of feeding the urea solution in the dosing valve 104 back to the urea tank 105. If urea crystals cannot be removed (and thus the dosing valve 104 does not move and is kept closed), the urea solution cannot be fed back nor supplied and therefore remains in the dosing valve 104. However, if the forced emptying and the supply of urea solution are still repeated to change the pressure applied to the urea solution in the dosing valve 104, the urea solution can be fed to the site of the urea crystal, and the urea crystal can be resolved and removed. In this way, if the cause of the malfunction of the dosing valve 104 is fixation of the urea crystal, the malfunction of the dosing valve 104 can be eliminated. If the malfunction of the dosing valve 104 cannot be eliminated by repeating the Steps S401 to S404 to repeat the forced emptying and the supply of urea solution a predetermined number of times, it can be determined that the dosing valve 104 has failed. In this case, it can be determined whether recovery from the malfunction is possible or not, so that it is possible to avoid warning the driver or the like of a failure when recovery from the malfunction is possible.

As described above, the recovery control system according to the present invention can allow the dosing valve to recover from a malfunction to a normal state.

In emptying, as described above, the dosing valve 104 is opened in advance, and the exhaust gas (air) in the exhaust pipe 102 is sucked into the urea tank 105 from the dosing valve 104. That is, if emptying occurs, the exhaust gas is sucked through the liquid feed line 116, the pressure-feed line 117 and other lines. Therefore, foreign matter or the like in the liquid feed line 116 and the pressure-feed line 117 can also be removed.

Figure 5:
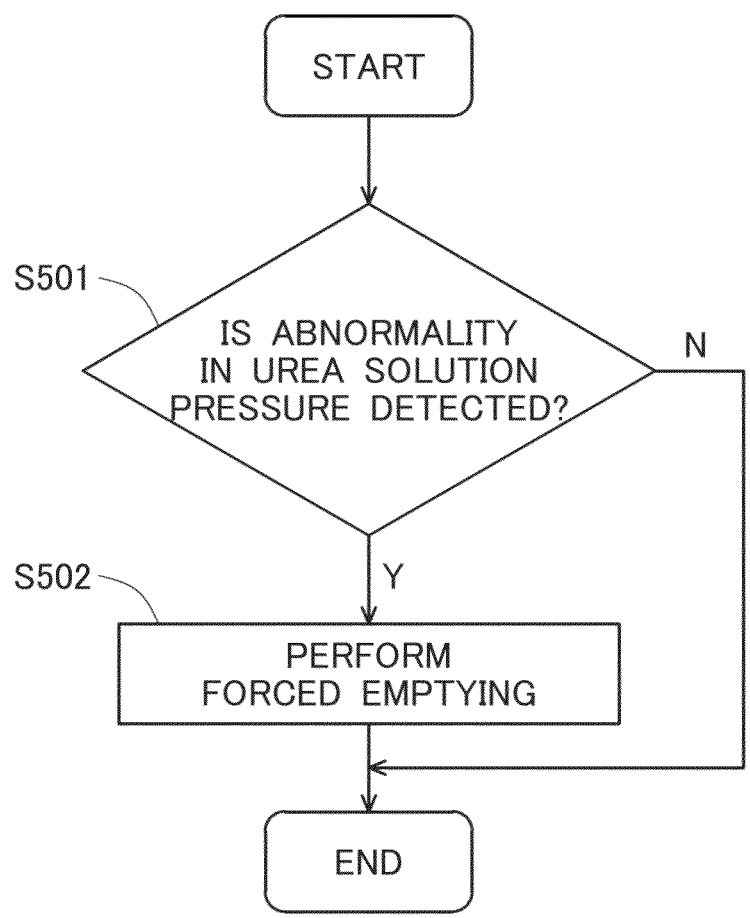
FIG. 5 is a flowchart illustrating an operation of the recovery control system according to the present invention.
Figure 6:
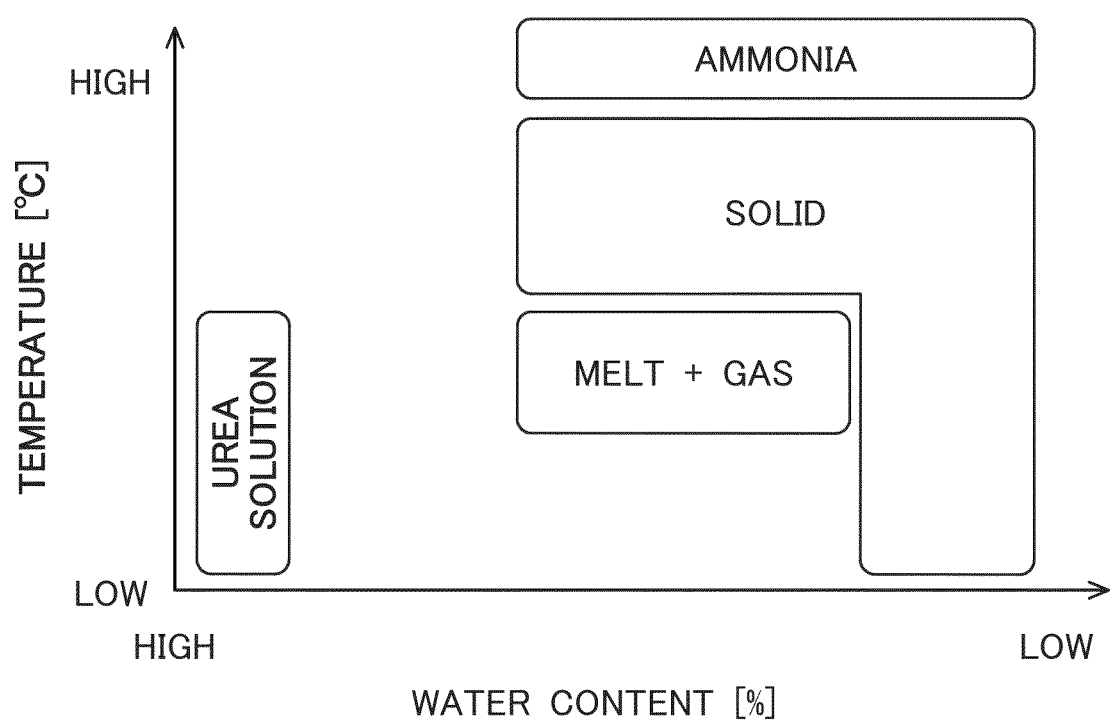
FIG. 6 is a diagram showing a change of state of urea solution with temperature.

In view of this, according to a modification of the present invention, the recovery control system may be provided with a pressure abnormality detector that detects an abnormality in the urea solution pressure based on the measurement value of the urea solution pressure sensor 114 that measures the pressure of the urea solution supplied to the dosing valve 104, and the recovery controller may perform forced emptying when the pressure abnormality detector detects an abnormality in the pressure of the urea solution. Specifically, as shown in FIG. 5, the pressure abnormality detector may detect whether the pressure of the urea solution supplied to the dosing valve 104 is abnormal or not (becomes constant or not) (S501), and the recovery controller may perform forced emptying (S502) when a pressure abnormality is detected in S501.

In this case, it is possible to detect clogging of the liquid feed line 116 and remove foreign matter that causes the clogging by forced emptying.

Furthermore, in forced emptying, the reverting valve 115 may not be activated, and the SM pump 112 may simply be turned off.

The invention claimed is:

1. A recovery control system that recovers a dosing valve of a vehicle engine from an abnormality state to a normal state, comprising:
    a dosing valve having an orifice opening to exhaust gas in an exhaust pipe of the vehicle engine to inject urea solution into the exhaust pipe and being heated by the exhaust gas at a high temperature when the engine is running;
    a urea tank serving as a source of the urea solution;
    a supply module that supplies the urea solution from the urea tank to the dosing valve and supplies the urea solution from the dosing valve back to the urea tank by force emptying the dosing valve;
    a detector that detects an open/close operation abnormality of the dosing valve caused by crystallization of the urea solution at the dosing valve due to the dosing valve being heated by the high temperature of the exhaust gas; and
    a controller configured to—
    when the operation abnormality is detected, open the dosing valve, to cause the supply module to force emptying of the urea solution from the dosing valve and supply the urea solution back to the urea tank, which draws the exhaust gas from the exhaust pipe through the orifice and into the urea tank, causing removal of the crystallized urea solution from the orifice and recovery of the dosing valve to the normal state, and
    then to supply the urea solution to the dosing valve.

2. The recovery control system according to claim 1, wherein the controller is further configured to cause repeatedly the force emptying and then the supply of the urea solution to the dosing valve.

3. The recovery control system according to claim 1, further comprising:
    a sensor that measures an abnormality in pressure of the urea solution supplied to the dosing valve,
    wherein, when the pressure abnormality is detected, the controller is configured to cause the supply module to force emptying of the urea solution from the dosing valve and feed the urea solution back to the urea tank, which draws the exhaust gas in the exhaust pipe into the urea tank through the orifice.

* * * * *